United States Patent [19]

Renier

[11] Patent Number: 5,201,968
[45] Date of Patent: Apr. 13, 1993

[54] TIRE PRESSURING AND REGULATING APPARATUS

[75] Inventor: Grant J. Renier, Allison Park, Pa.
[73] Assignee: Cycloid Company, Pittsburgh, Pa.
[21] Appl. No.: 750,606
[22] Filed: Aug. 27, 1991
[51] Int. Cl.⁵ .................... B60C 23/10; F04B 19/02
[52] U.S. Cl. .................... 152/418; 152/415; 417/211; 417/233; 417/328
[58] Field of Search .............. 152/415, 418, 419, 427; 417/233, 231, 211, 328

[56] References Cited

U.S. PATENT DOCUMENTS

| | | | |
|---|---|---|---|
| 1,679,505 | 8/1928 | Stewart | 152/419 |
| 1,930,041 | 10/1933 | Crowley et al. | 417/211 |
| 2,055,983 | 9/1936 | Peo | 417/233 |
| 4,349,064 | 9/1982 | Booth | 152/418 |

FOREIGN PATENT DOCUMENTS

429262  5/1935  United Kingdom ................ 417/233

Primary Examiner—Michael W. Ball
Assistant Examiner—Francis J. Lorin
Attorney, Agent, or Firm—Clifford A. Poff

[57] ABSTRACT

Apparatus for harnessing and utilizing, inter alia, cyclic forces generated at a location eccentric from the axis of rotation of a rolling wheel. The apparatus may include, for example, pumps that can be attached to the valve stem of an automobile wheel in order to pressurize under-inflated tires and maintain tire pressure at a preset value.

34 Claims, 11 Drawing Sheets

TIRE PRESSURING AND REGULATING APPARATUS

BACKGROUND OF THE INVENTION

1. Field of the Invention

The present invention relates to an apparatus to pressurize a pneumatic tire during rotation thereof and, more particularly, the present invention provides such an apparatus mounted externally of the pneumatic tire at a site eccentric to rotation of the tire for utilizing a locus of forces to pressurize air to control the inflation of the tire.

2. Description of the Prior Art

While not so limited, the present invention provides a pneumatic pump constructed for attachment to an air supply valve stem of a pneumatic tire of an automobile or the like, to pressurize and, if desired, control the tire pressure at a predetermined pressure. In U.S. Pat. No. 4,349,064 there is disclosed a tire pump mounted within a tire. A piston of the pump moves radially with respect to the rim. The pump is mounted on the tire rim and is actuated by centrifugal force to draw in and pressurize atmospheric air as the tire rolls along the ground. When the pressure within the tire reaches a pre-set level the air in the tire is recirculated through the pump to prevent the buildup of excessive pressure. Such a system requires permanent attachment of the pump to the rim of the wheel, modification of the wheel structure, and removal of the tire in order to service or replace the pump.

Other known centrifugally-operated pump regulators are described in U.S. Pat. No. 4,570,691 wherein the pump is secured to the wheel rim interiorly of the tire and in U.S. Pat. No. 4,651,792 wherein the pump is secured to the interior of the tire. These pumps suffer from disadvantages similar to those associated with U.S. Pat. No. 4,349,064. Furthermore, all of the aforementioned pumps/regulators operate exclusively on the principal of harnessing and utilizing only centrifugal force, a force which is not cyclic so that the pump must embody a design to operate independent of wheel translation.

In so far as presently known, there is no known mechanical application to utilize the combination of centrifugal and gravitational forces occurring at a location eccentric from an axis of rotation of a body experiencing rolling translation. Such forces resolve to a resultant force that is ever changing during each rotation at all points eccentric from the axis of rotation of a rolling vehicle wheel. Hence, an advantage exists for an apparatus for harnessing and utilizing the locus of forces at a location eccentric from an axis of rotation of a rolling body, particularly, a vehicle wheel or the like. Such an apparatus can be mounted to a vehicle wheel and advantageously used, inter alia, to power a pump for pressuring and, if desired, regulating the pressure of a pneumatic vehicle tire.

The forces driving this kind of pump are forces that are normally imparted to on the valve of a rotating tire while a vehicle is in motion. The variability of these force during each complete revolution of the wheel are sufficient to impart the reciprocal motion to a piston type pump for vehicle speeds above a certain minimum speed of about 10 miles per hour, for example. The pressurizing of a low volume of air to a predetermined pressure by the pump can be controlled by diverse means such as a pressure control valve to maintain the tire pressure at a desired level required by present day standards. The input of air pressure from the pump may, if desired, be applied in opposition to the pneumatic pressure of the tire such that the tire pressure is increased or by a reverse flow of air, a small volume of air can be exhausted through a pump to the atmosphere. In this mode of operation, the tire pressure is reduced incrementally according to the magnitude of pressurization of air by the pump. This enables a pump construction to achieve and maintain a predetermined tire pressure according to operating parameters for the tire such as radius rotation for the tire, desired tire pressure and air pressure volume of the tire.

There are significant benefits from such a system to the owner of a vehicle whether it is an automobile, motorcycle or truck. First, the maintenance of the correct tire pressure will protect a tire from over or under inflation and result in its longer life for the tire. Second, this system, when applied to all wheels of a vehicle, will maintain even and balanced inflation in all tires and allow for easy and safe handling of the vehicle. Incorrect tracking of the vehicle due to uneven tire pressure will be eliminated. Tire wear will be improved relatively constant and balanced to all tires over their useful life. Lastly, the maintenance of correct tire pressure will increase gas mileage of the vehicle and provide a further saving to the operator. It has been reported by the Federal Department of Transportation that 2 million gallons of gasoline a day could be saved if all motor vehicles on the road were to operate with correct tire pressures.

It is an object of the present invention to provide apparatus for harnessing and utilizing forces at a location eccentric from the axis of rotation of a vehicle wheel for pressurizing and regulating the air pressure of a pneumatic tire carried by the wheel.

It is a further object of the present invention to provide a readily accessible pneumatic tire pump/regulator which can be manufactured for incorporation as part of or for releasably attachment to existing valve stem structure for a pneumatic tire.

It is a further object of the present invention to provide a pneumatic tire pump/regulator requiring no modification of either the vehicle wheel or the pneumatic tire.

Still other objects and advantages of the present invention will become apparent in light of the attache drawings and written description of the invention presented hereinbelow.

SUMMARY OF THE INVENTION

In accordance with the present invention there is provided a pump apparatus that can be attached to the valve of an automobile tire in order to pressurize the pneumatic chamber of the tire and thereby maintain tire pressure at a preset value. The forces driving these kinds of apparatus are forces that are normally created at the valve stem of a rotating tire while a vehicle is in motion. These forces increase as vehicle wheel rotational velocity increases. At a nominal rate of speed generally 10 miles per hour and above, these forces are sufficient to provide the necessary mechanical advantage to drive one of a number of varieties of air pumps.

More particularly, according to the present invention there is provided an apparatus for utilizing a cyclically, ever changing, resultant force of a centrifugal force and gravitational force, the apparatus comprising, pump means responsive the cyclically ever changing resultant force of centrifugal and gravitational force for pressurizing air to inflate the pneumatic tire, and means at the site eccentric to the axis of rotation of the pneumatic tire for attaching said pump means to the vehicle wheel externally of the pneumatic tire.

Preferably means is provided to control supply of pressurized air to the pneumatic tire. Such means may take the form of a control valve to prevent pressurizing the pneumatic tire beyond a predetermined tire pressure. The pump means preferably includes a piston driven pump coupled to a reciprocal intensifier means responsive to cyclic differences to the resultant force for restoring the pump piston to a start position for each succeeding pumping cycle.

DESCRIPTION OF THE PREFERRED EMBODIMENTS

A mathematical model is useful for determining the magnitude of the resultant force of centrifugal and gravitational forces acting on a tire valve stem. As will be seen, the resultant force varies with vehicle velocity, translational, as well a magnitude of rotational speed of the valve stem about the rotational axis of the wheel. Essential to the invention is the fact that the resultant force varies cyclically with each rotation of a wheel.

The model simulation beings with a consideration of a point on a revolving wheel independent of translational advancement of wheel across a surface and with or without slip. The point on the wheel is assumed remote to the axis of rotation and is the focus of the resultant of two forces. One force centripetal acceleration "a" acting on a mass located at the point on a wheel in a direction extending from the center of wheel rotation toward perimeter of the wheel. The second force is gravity. The magnitude of the first force is a function of the linear velocity "v" of the point at a distance from the wheel axis "r". Thus centripetal acceleration is given by the equation:

$$a = v^2/r \qquad \text{EQUATION 1}$$

In terms of instantaneous angular speed "$\Omega$", centripetal acceleration is given by the equation:

$$a = r\Omega^2 \qquad \text{EQUATION 2}$$

Using equation 1 as basis, one can derive linear velocity v in terms of vehicle velocity V, the radius of the point on the wheel r and the radius of the wheel R as follows:

$$v = Vr/R \qquad \text{EQUATION 3}$$

The centripetal force Fc is a vector with its direction perpendicular to a line passing through the wheel axis and its magnitude as a function of centripetal acceleration a and mass m as follows:

$$Fc = ma \qquad \text{EQUATION 4}$$

The centripetal force can than be calculated as a function of vehicle velocity, the radii and mass by combining equation 1 and 3 in equation 4 as follows:

$$Fc = mV^2r/R^2 \qquad \text{EQUATION 5}$$

The pump of the present invention is driven by a reciprocal piston responsive to a resultant force that includes a centripetal force vector which must be, by convention, reversed 180° to point outwardly from the wheel axis and called centrifugal force.

The direction of the force vector is not always on a line passing through the wheel axis. During vehicle acceleration and deceleration the force vector will be a few degrees in front of or behind the wheel axis, respectively, when considering the direction of movement by the vehicle. However, the affects of this additional vector component on the pump is minor and of little additional benefit or limitation to the pump operation, even under high rates of vehicle acceleration and deceleration. The objective of maintaining tire pressure is achieved by harnessing readily and continuously available forces. Extreme changes to vehicle velocity may cause the pump to momentarily cease operation and resume normal operation when the extreme changes subside.

As identified above, the other force acting on a point mass on the rim spaced from the rotational axis of the wheel is gravitation (Fg). This force vector has a constant magnitude of 386.40 inches per second squared with a vertical down direction acting on the mass. As the wheel rotates, the gravitational force is added to or subtracted from the centripetal force depending on the angle of rotation. According to the mathematical model at 0° of rotation there is a state where the point on the wheel is on a line passing through the wheel rotational axis and a point on the wheel in contact with the ground surface.

Figure 1:
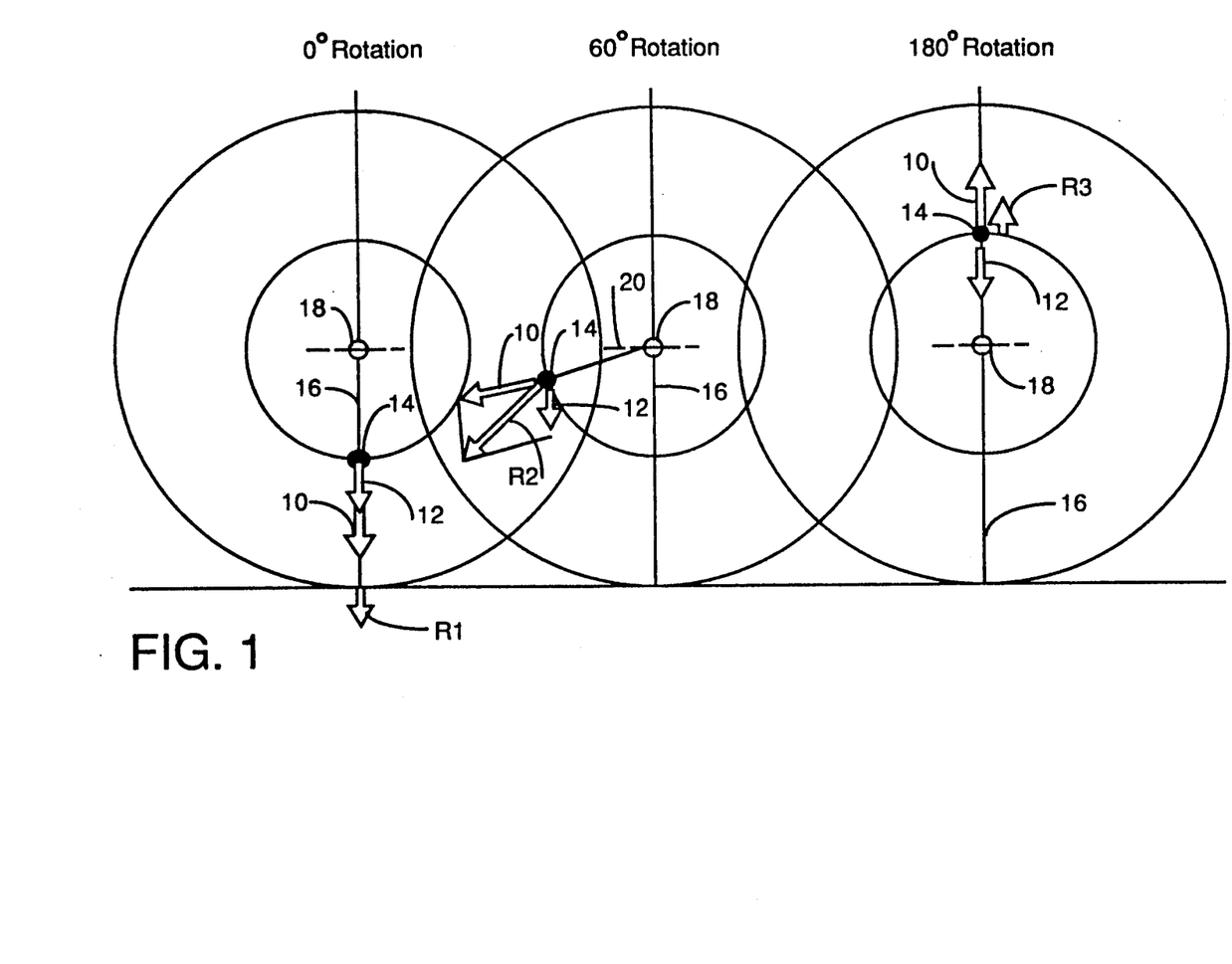
FIG. 1 represents a portion of a cycloid path generated by a point eccentric to the central axis or axle of a rolling circular object.

A part of the FIG. 1 illustration shows that at 0° rotation, the centrifugal force vector indicated by arrow 10 and gravitational force vector indicated by arrow 12 complement each other and exert a combined resultant force R1 acting on a point 14 within a vertical plane 16 spaced from and containing the wheel rotational axis 18. The centrifugal force vector 10 and gravitational force vector 12 at 60° rotation of the wheel diverge at an angle of 60° with the gravitational force remaining vertical and parallel in plane 16. The centrifugal force act in a plane 20 passes radially between axis 18 and point 14. The resultant force vector R2 has decreased in magnitude and changed direction when compared with the resultant force vector R1 at 0° rotation. At 180° rotation, the vector of the gravitation force vector 12 is subtracted from the vector of the centrifugal force 10. The resultant force vector R3 is now directed in the vertical plane 16 in an upward direction away from wheel axis 18; assuming that the vehicle velocity is sufficient to impart a centrifugal force vector greater than the gravitational force vector. This generally occurs at vehicle velocities above 7 miles per hour given present day typical tire dimensions.

Figure 2:
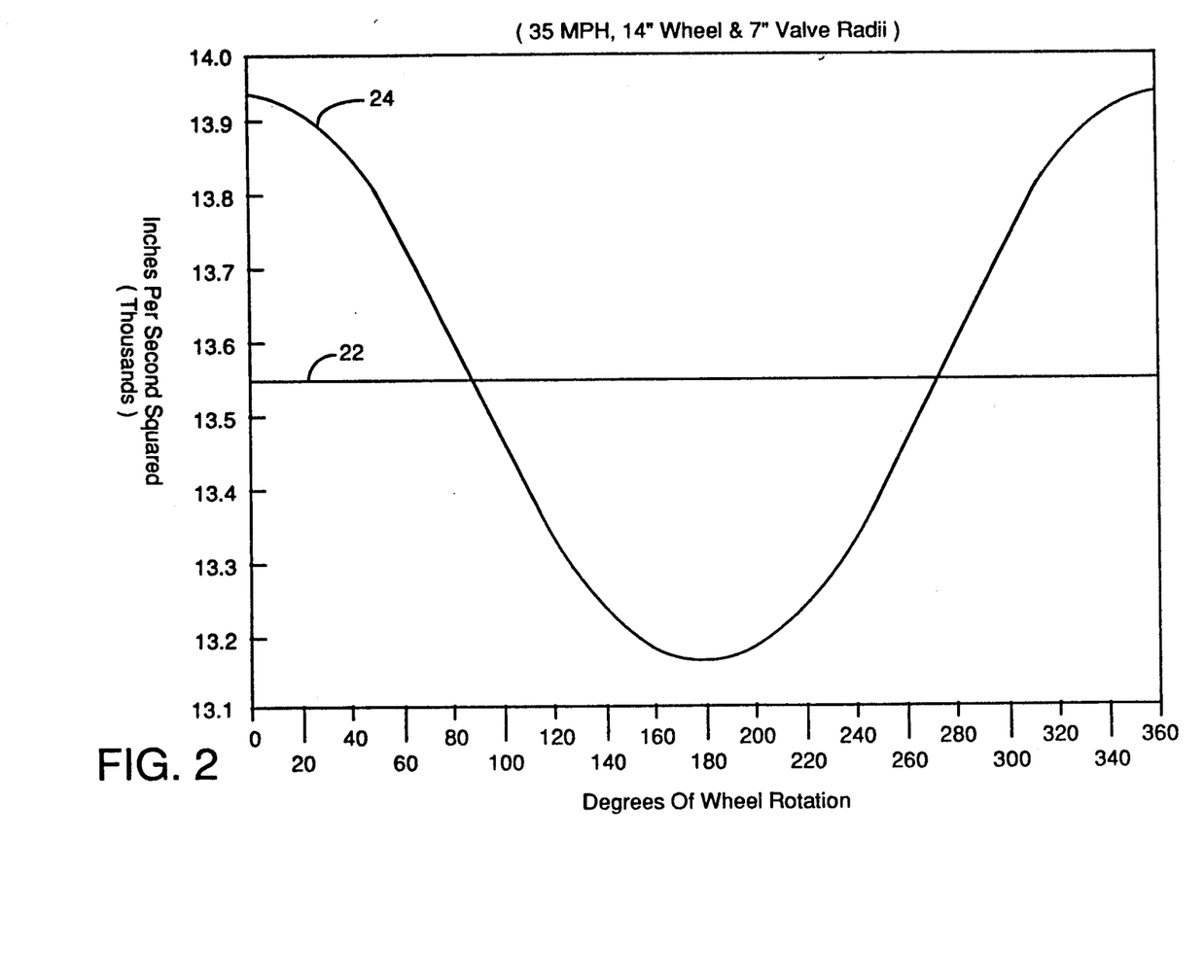
FIG. 2 is a graphical representation of the radial acceleration and the gravitational acceleration of the valve stem whose path is illustrated in FIG. 1.

Graph line 22 in FIG. 2 illustrates the constant magnitude of the centrifugal (radial) acceleration. Graph line 24 illustrates the combination of centrifugal and gravitational accelerations in inches per second squared for an assured vehicle traveling 35 miles per hour, a wheel radius of 14 inches and a valve radius of 7 inches. The sinusoidal nature of graph line 24 demonstrated the magnitudinal change to acceleration. The cyclic effect of the gravitational force on the radially directed centrifugal force for degrees of rotation from 0° to 180° is the inverse but repeated for degrees of rotation from 180° to 360°. As can be seen from FIG. 3, the magnitude of resultant force ever changes as a function of the included angle between the gravitational and centrifugal forces. The pump of the present invention embodies a construction of parts for operating such that centrifugal force vector acting on the pump is large in relation to the gravitational force vector.

Figure 3:
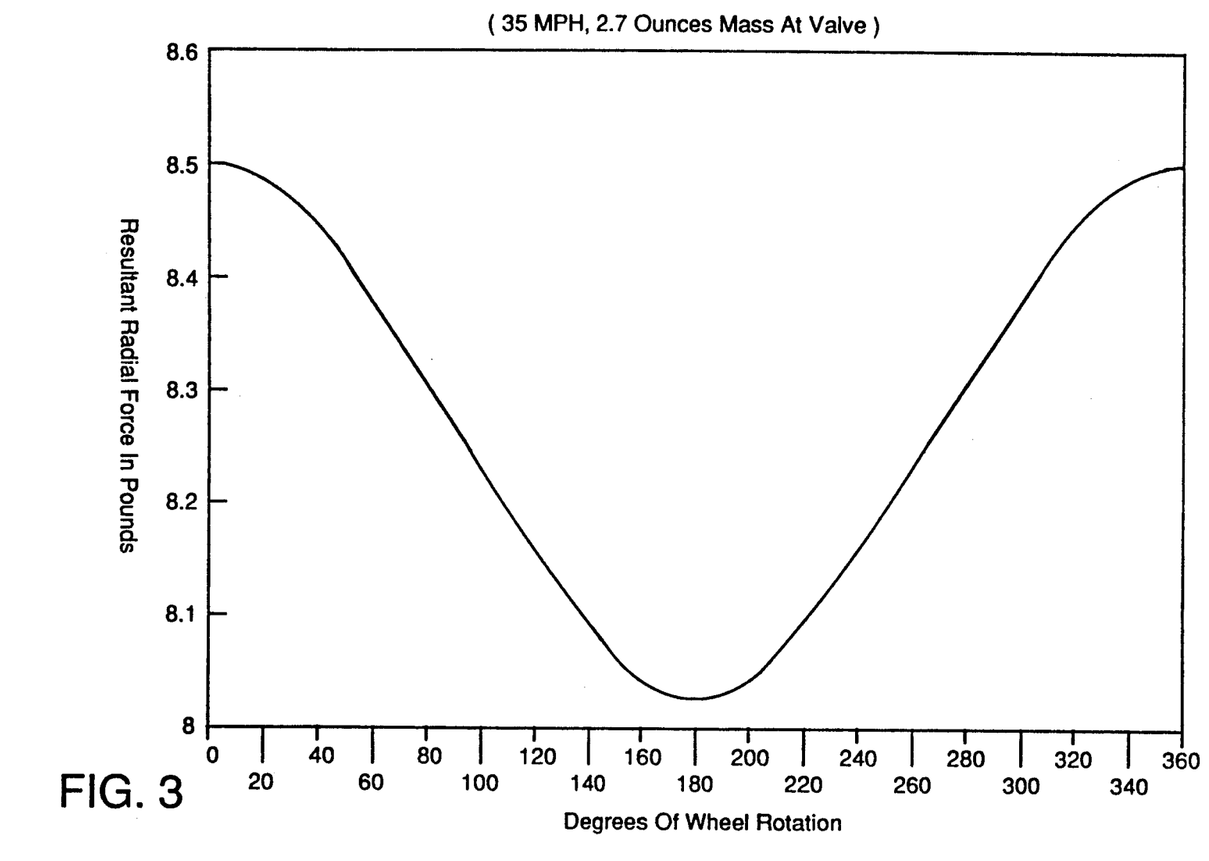
FIG. 3 is a graphical representation of the magnitude of the resultant radial force deviations or with angular changes in degrees of wheel rotation.

The graph line in FIG. 3 displays the variation of the resultant force of the combined acceleration from FIG. 2 acting on a mass of 2.7 ounces located at the wheel valve. At 35 miles per hour, the force variance is approximately 6% of the minimum force and is directed radially away from the wheel axis. As vehicle velocity increases, the variance becomes a smaller percentage of the minimum resultant force.

Figure 4:
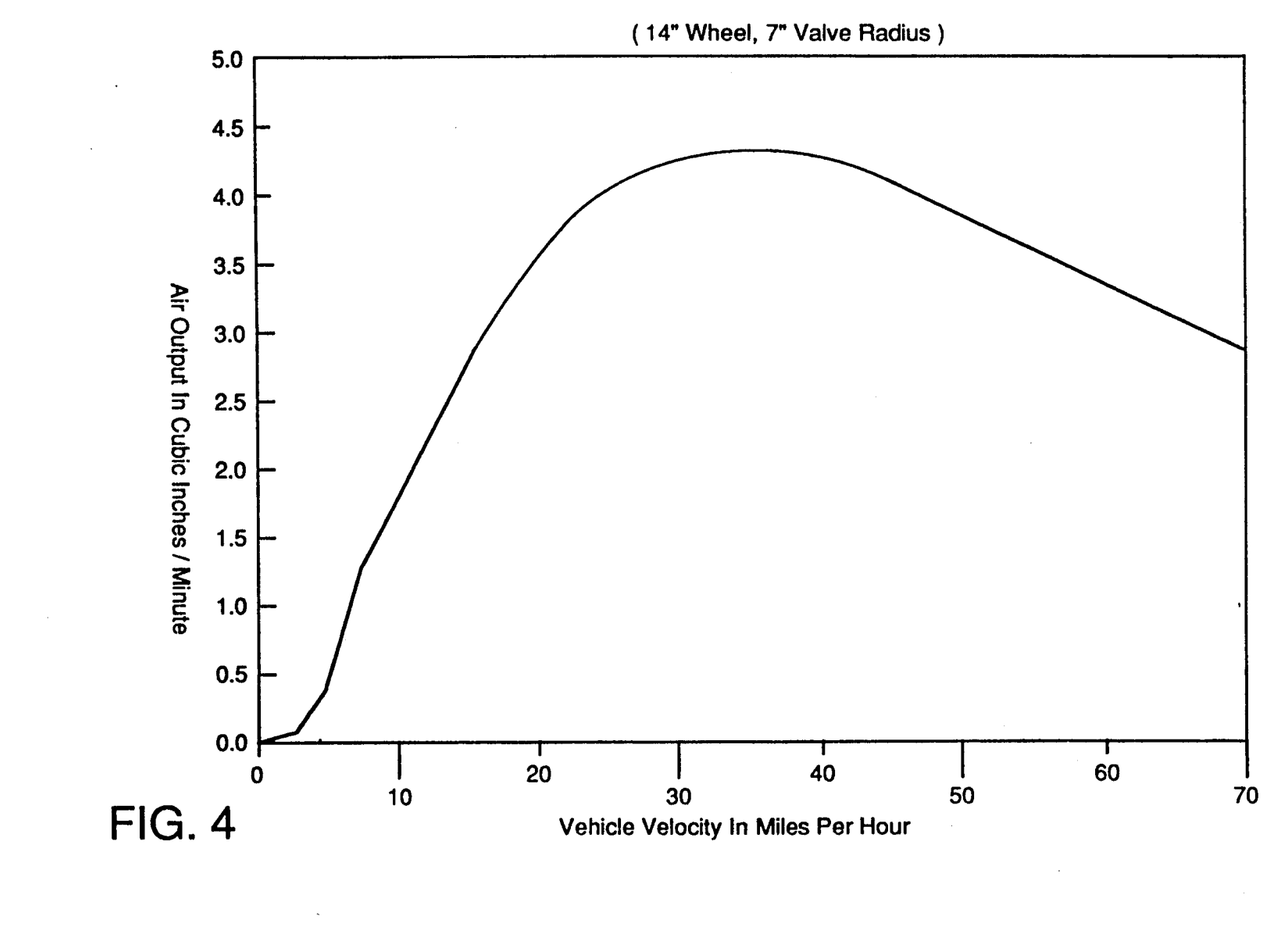
FIG. 4 is a graphical representation of the displacement volume of air in relation to vehicle velocity.

The resultant radial force of FIG. 3 forms the basis for the graph line in FIG. 4 to demonstrate the effect of the variation to the volume of air that can be pumped over vehicle velocities ranging from 0 to 70 miles per hour. It is preferred to utilize a pump design wherein the effective compressed air output occurs at vehicle speeds from 30 to 50 miles per hour, which represent the speeds driven by the average commuting driver. The design can be modified to provide higher outputs at other velocity ranges depending on the expected use of the vehicle. The graph of FIG. 4 also demonstrates that at a speed of up to about 3 miles per hour, the pump out-put will be zero as the vehicle speed increases from 3 miles per hour, the pump out-put dramatically increases to useful air volumes.

Figure 5:
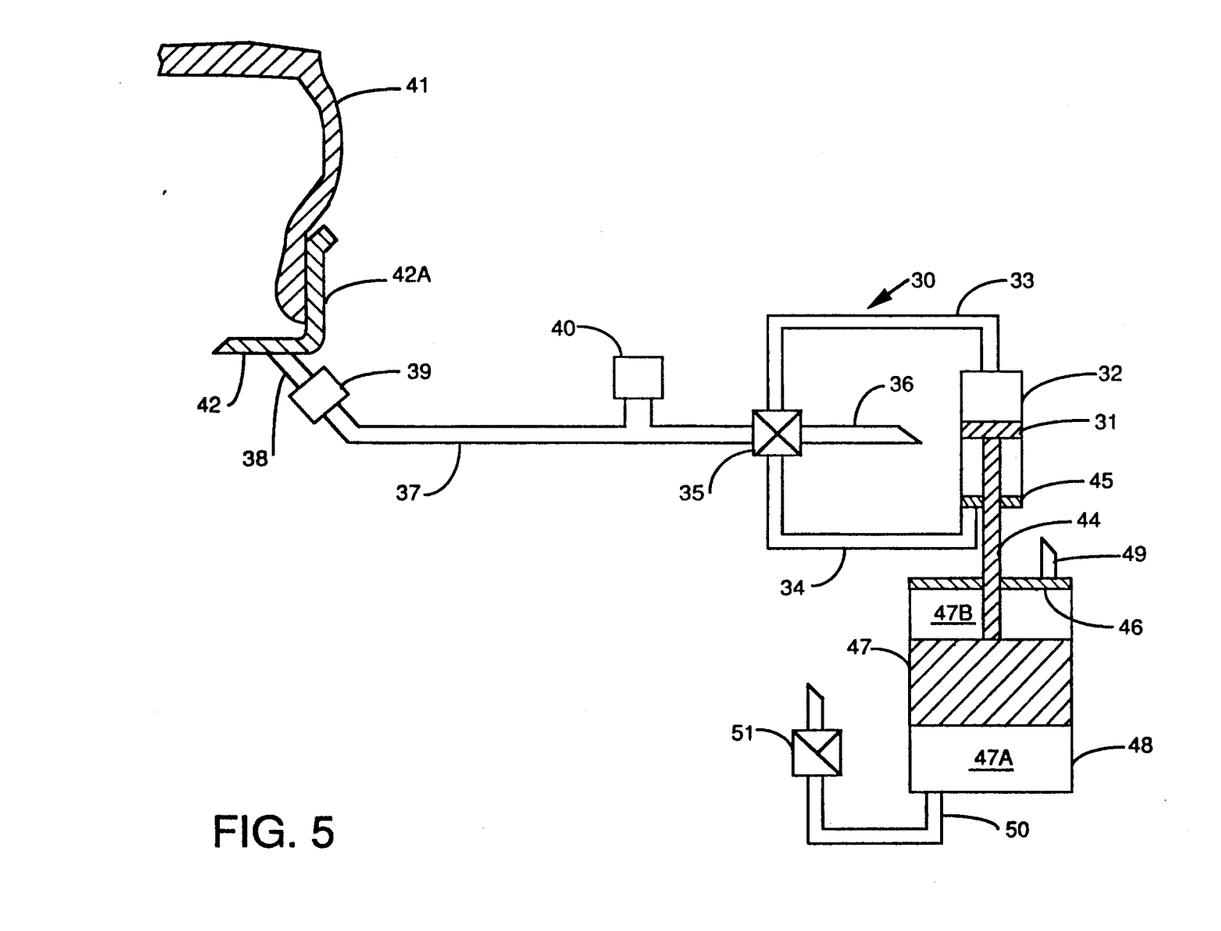
FIG. 5 is a schematic illustration of one embodiment of applicants invention.

Turning now to FIG. 5, there is illustrated a pump apparatus 30 embodying the features of the present invention. The pump apparatus includes piston 31 mounted to reciprocate in a cylinder 32 which is connected at the opposite ends of the cylinder by air ducts 33 and 34 to a control valve 35. Valve 35 is preferably an air pilot pressure operated valve responsive to the pressurized air in ducts 33 and 34. The valve 35 functions to control the supply atmospheric air in a duct 36 to ducts 33 and 34 as the piston 31 reciprocates in the cylinder from end to end between the openings to ducts 33 and 34. When atmospheric air is fed to the piston and cylinder assembly, pressurized air is directed by valve 35 from duct 37 to an air inlet port of a valve stem 38. Duct 37 and valve stem 38 are releasably connected together by a connector which includes a threaded collar 39. As with this embodiment and the embodiments described hereinafter, the pump apparatus is secured in a fixed position to the valve stem so that the piston supplying pressurized air to the tire reciprocates to the cylinder along a path that is always parallel to the radial line extending between the rotational axis of the wheel and the valve stem. The magnitude of the air pressure in duct 37 is controlled by a regulator 40 which is adjustable to allow a release to atmosphere of an air supply on a continuous monitoring basis so as to maintain a predetermined air pressure in the pneumatic tire assembly 41. The assembly 41 includes a tire rim 42 having a bead support flange section 42A by which a tire bead is supported and sealed in an air tight manner as is well known.

According to the embodiment of the invention shown in FIG. 5, the piston 31 is mechanically connected by a rod 44 which passes through air seals 45 and 46 to interconnect piston 31 with a piston 47. The piston 47 is much larger in diameter and mass than piston 31 to thereby form a force intensifier. Piston 47 reciprocates in a cylinder 48 between opposite end walls, one of which supports the seal 46. At the opposite end walls there are ducts 49 and 50. Duct 49 extends to the atmosphere, and thereby maintains atmospheric pressure in chamber 47B. Duct 50 is coupled to a valve 51 which controls the passage of air to and from chamber 47A. Valve 51 is pilot pressure operated.

Figure 6A:
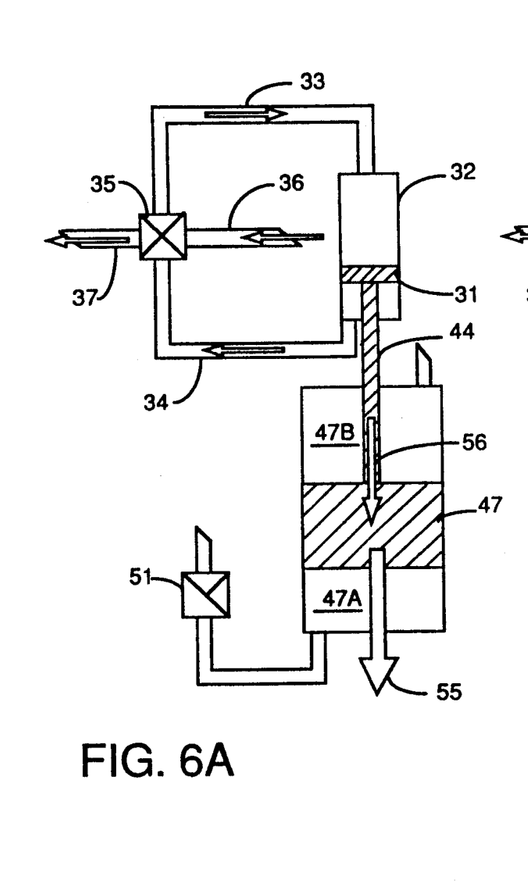
FIGS. 6A, 6B and 6C are schematic illustrations of pump stroke changes occurring with wheel rotation.
Figures 6B, 6C:
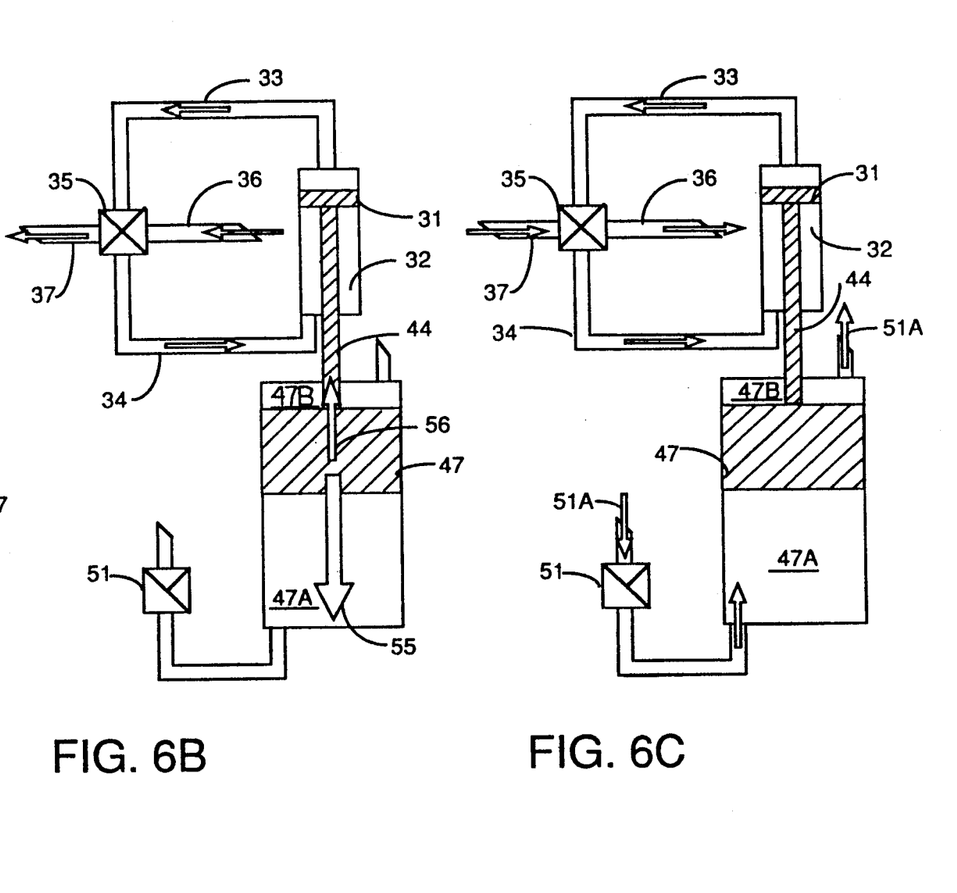

FIG. 6A, 6B and 6C are schematic illustrations of the apparatus shown in FIG. 5 to better illustrate the sequence of operation of pump apparatus as just described in FIG. 5. In FIG. 6A the relative position of the pump parts occurs in response to the resultant force to centrifugal force indicated by arrow identified by reference numeral 55 which acts in the same direction as gravitational force represented by an arrow identified by reference numeral 56. The resultant force acts in direction to force piston 47 to compress air in a chamber of 47A and forms a high pressure cushion. The force on piston 47 is imparted to piston 31 by the direct mechanical couple therewith by rod 44. Air pressurized by piston 47 is expelled from the end of cylinder 32 by duct 34 which is directed by valve 35 to duct 37 and thence to the tire. To allow displacement of piston 47, atmospheric air is in duct 36 is directed by valve 35 to duct 33 and thence to the piston end of piston 31.

The centripetal stroke is illustrated by FIG. 6B. The centrifugal and gravitational forces are indicated by arrows and identified by reference numerals 55 and 56 respectively. As shown, the forces act in opposite directions. The gravitational force and the restoring force by the high pressure air cushion of chamber 47A are greater than the centrifugal force. This brings about a displacement of piston 47 and thereby also piston 31 to compress air in a chamber 32. The force on piston 47 imparted to piston 31 by the direct mechanical couple therewith pressurized air which is expelled from the end of cylinder 32 by duct 33. Air in duct 33 is directed by valve 35 to duct 37 and thence to the tire. To allow displacement of piston 47, atmospheric air in duct 36 is directed by valve 35 to duct 34 and thence to the rod end of piston 31.

In FIG. 6C the pump reset position due to non-rotation of the wheel is depicted by the relative position of the parts. Valve 51 is open to air from the atmosphere in line 51A. The piston 47 moves in a direction to, reduce the volume of chamber 47B. The force on piston 31 drives piston 47 by the direct mechanical couple therewith. Air is displaced by piston 31 to duct 33 and directed by valve 35 to atmosphere. Displacement of piston 31 causes a back-flow of air from pneumatic tire in duct 37 through valve 35 to duct 34 and thence to the rod end of piston 31. At the same time air is exhausted from the cylinder 32 by piston 31 through duct 33 and valve 35 to the atmosphere by duct 36.

If regulator 40 is not desired and if the conventional one way valve stem check valve is eliminated, the tire pressure can be directed to act on the pressure side of the pump to eliminate an excessive pressure in the tire. This is achieved in reference to, for example, in FIG. 6A, by allowing that the pressure in duct 34 when applied in opposition to the tire pressure is such that the tire pressure is greater than the pressure in duct 34. When this occurs, the piston 31 is driven in response to the pressure differential along cylinder 32, thus also displacing piston 47 in a direction opposing the centrifugal force identified by reference numeral 55. The volume of air received in the cylinder at the rod end of piston 31 will be exhausted from the system when valve 35 assumes an operating condition where duct 34 communicates with duct 36. In this way, the quantity of air in the tire can be incrementally reduced until the pressure of the tire is equal and opposite to the pressure developed in the cylinder 32 through the operation of the pump of the present invention. Such excessive pressurization of the tire can be seen to occur when the tire operates at an elevated temperature for a period of time thus causing a temporary increase to the tire pressure due to air pressure changes because of the elevated temperature. After reducing to a normal atmospheric temperature, the tire pressure can be restored to a predetermined desired pressure through the operation of the pump of the present invention.

Figure 7:
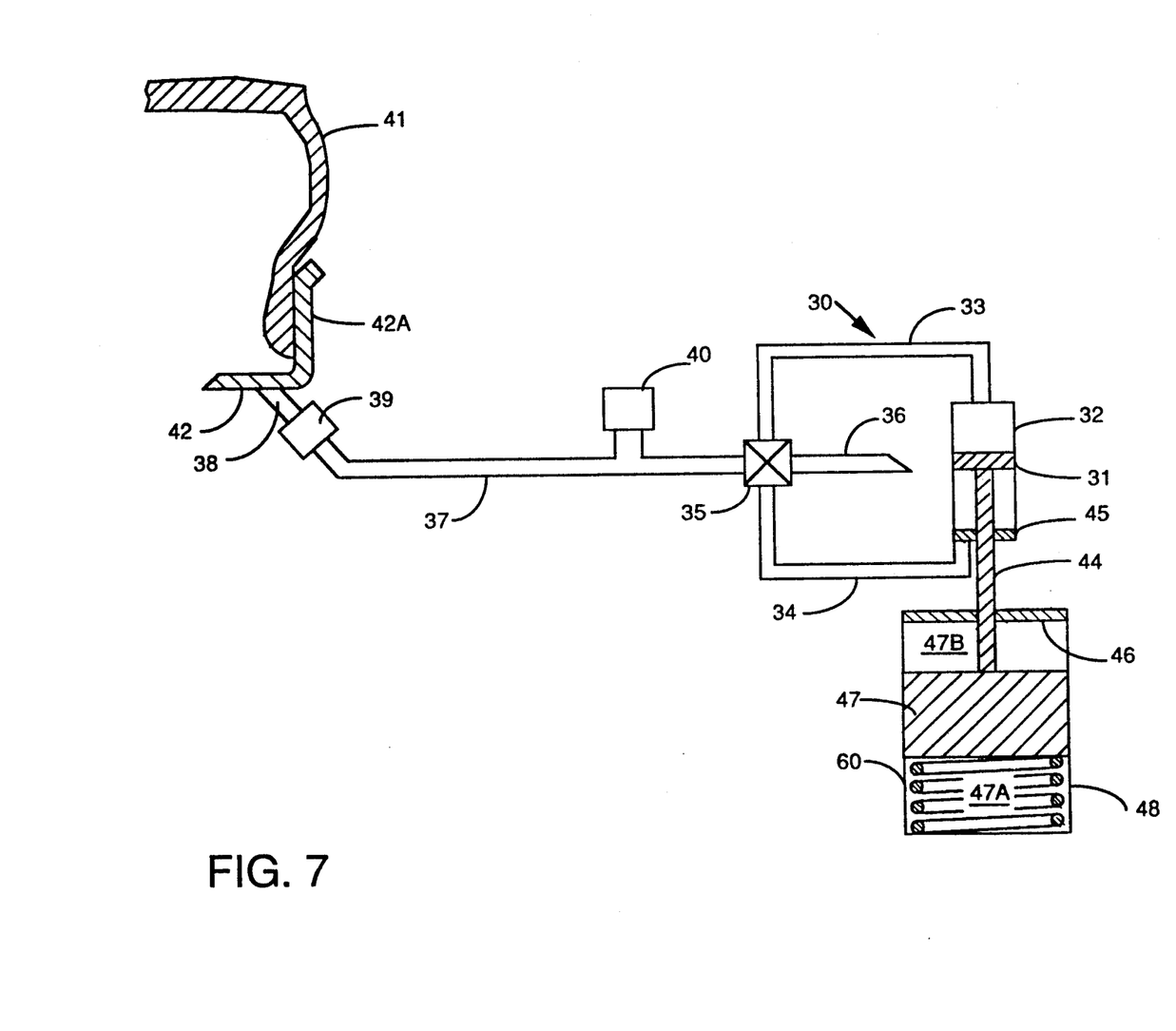
FIG. 7 is a view similar to FIG. 5 and illustrating a second embodiment of cushion device in the pump of the present invention.

The pneumatic cushion provided by the operation of valve 51 and piston 47 serves to generate not only an intensified pressure acting on piston 31 but also provides a restoring force to the piston 31 in the mechanical system. Such a restoring force can however be accomplished by means other than an air cushion. An example of another means to provide a restoring force is shown in FIG. 7. In FIG. 7, parts which are the same as parts already described and shown in FIG. 5 are identified by the same reference numerals. Piston 47 is acted upon by a spring 60 in response to gravitation forces. The resilient force of spring 60 is applied to piston 47 while situated in the chamber 47A. Spring 60 creates an effective cushion and also provides that a range of the stroke by the piston can be maximized for a narrow range of wheel velocities to take advantage of the spring harmonics.

While not shown in the drawings, another form of cushion for the operation of piston 47 can be achieved by the combination of permanent magnetic inserts. One magnetic insert will be provided in the piston 47 and the magnetic insert of opposite polarity will be imbedded in the end wall of cylinder 48 adjacent of cushion chamber 47A. As will also be understood by those skilled in the art, a combination of air, magnetic and spring cushions may be utilized for the pump of the present invention. A further form of a cushion for the operation of the present invention shown in FIG. 8, wherein a reference numeral applied to parts that are the same as parts already described in FIG. 5 are identical and the description given heretofore is equally applicable.

Figure 8:
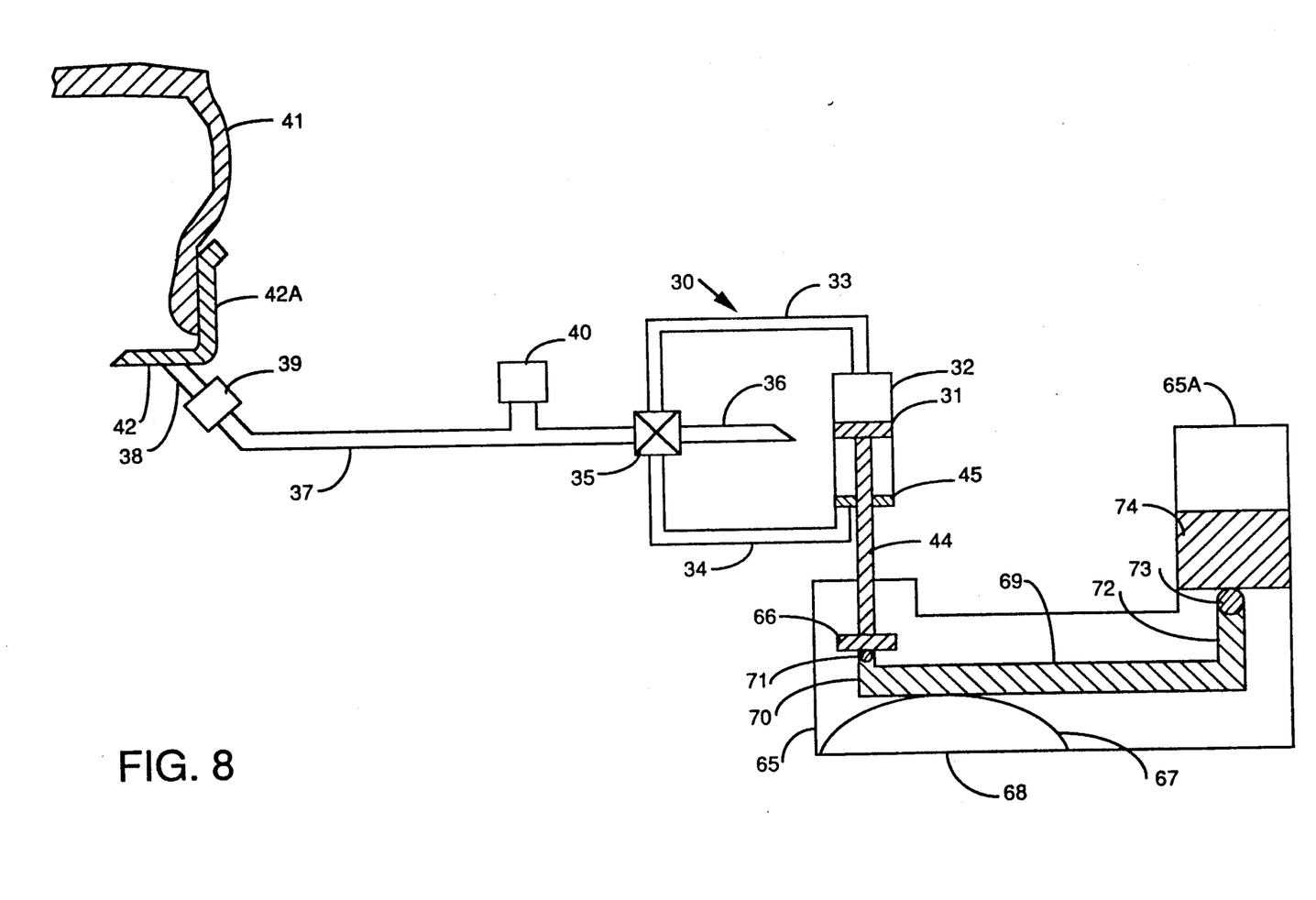
FIG. 8 is a third embodiment of a cushion device in the pump of the present invention.

In FIG. 8, rod 44 extends from piston 31 into a chamber 65 where the free end of rod 44 is provided with a drive plate 66. A curve surface 67 generally in the form of a hyperbola is formed on a fulcrum support 68. Surface 67 contacts the midpoint of a lever 69 having at one end an upstanding leg 70 provided with a load bearing insert 71 in contact with drive plate 66. The opposite end of lever 69 has an upstanding leg 72 having a load bearing insert 73 contacting a lower surface of a counterweight mass 74 that can slide generally parallel with piston 31 in a chamber 65A forming an extension of chamber 65. In this embodiment, movement by the piston 31 is cushioned by mechanical system wherein the constant load provided by the counterweight mass 74 is transformed into an ever-changing force applied to rod 44 by the hyperbolic configuration of the surface 67. It can be seen that the effective length of the lever changes cyclically with the stroke of the piston.

Figure 9:
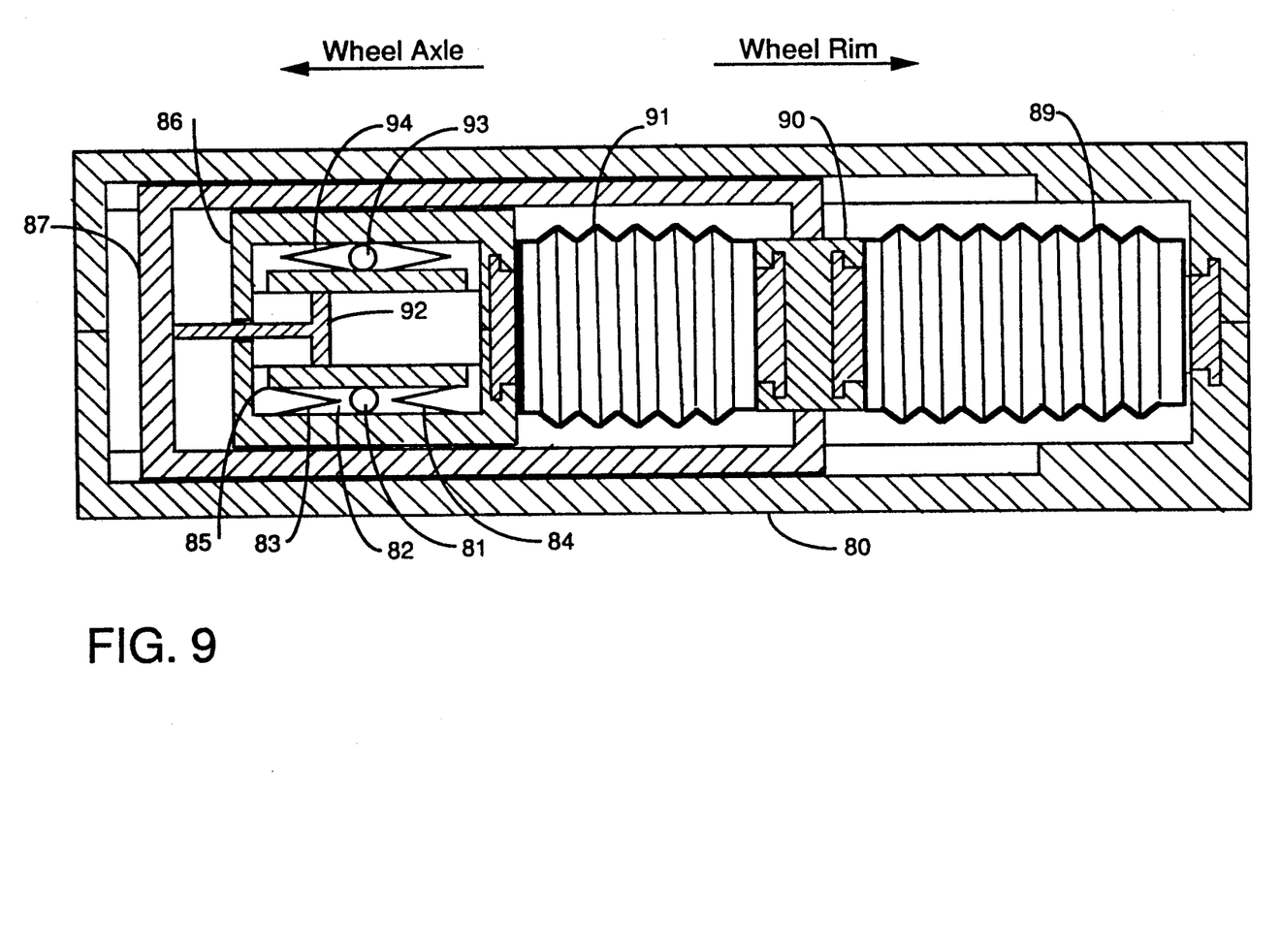
FIG. 9 is an enlarged illustration of a dual cushion pump embodying the features of the present invention.

Shown in FIG. 9 is another embodiment of the present invention. In this embodiment, a pump housing 80 is attached by way of an air duct to a valve stem. The air outlet duct communicates with an opening 81 formed in an outlet channel 82. The outlet channel 82 is closed at its opposite ends by one-way reed valves 83 and 84. These valves are situated in a chamber that is formed by a sleeve 85 which is attached to closed housing 86. Housing 86 is connected to pump housing 80. Connector 87 has a splined external surface which can slide within a mating spline surface in the pump housing 80. The end wall of housing 80 has a pocket to receive a connector of a high pressure bellows 89 that is in turn supported at its opposite end by a connector joined with a piston 90. Piston 90 can move back and forth while slidably supported in an opening formed in an end wall of connector body 87. Piston 90 is also joined by a connector to a low pressure bellows 91 that is in turn joined externally to an end wall of housing 86. Connector body 87 can reciprocate internally in the cavity of pump housing 80. During such reciprocating movement, a piston 92 attached at its rod end by body 87 and pass through an opening in end wall of housing 86 is caused to reciprocate in the internal cylindrical cavity of sleeve 85. Such reciprocating movement causes pressurization of atmospheric air that is fed through an opening 93 and passed through one-way reed valve 94. The atmospheric air emerging from the reed valve enters either the rod end or the piston end of piston 92 within sleeve 85.

Figure 10:
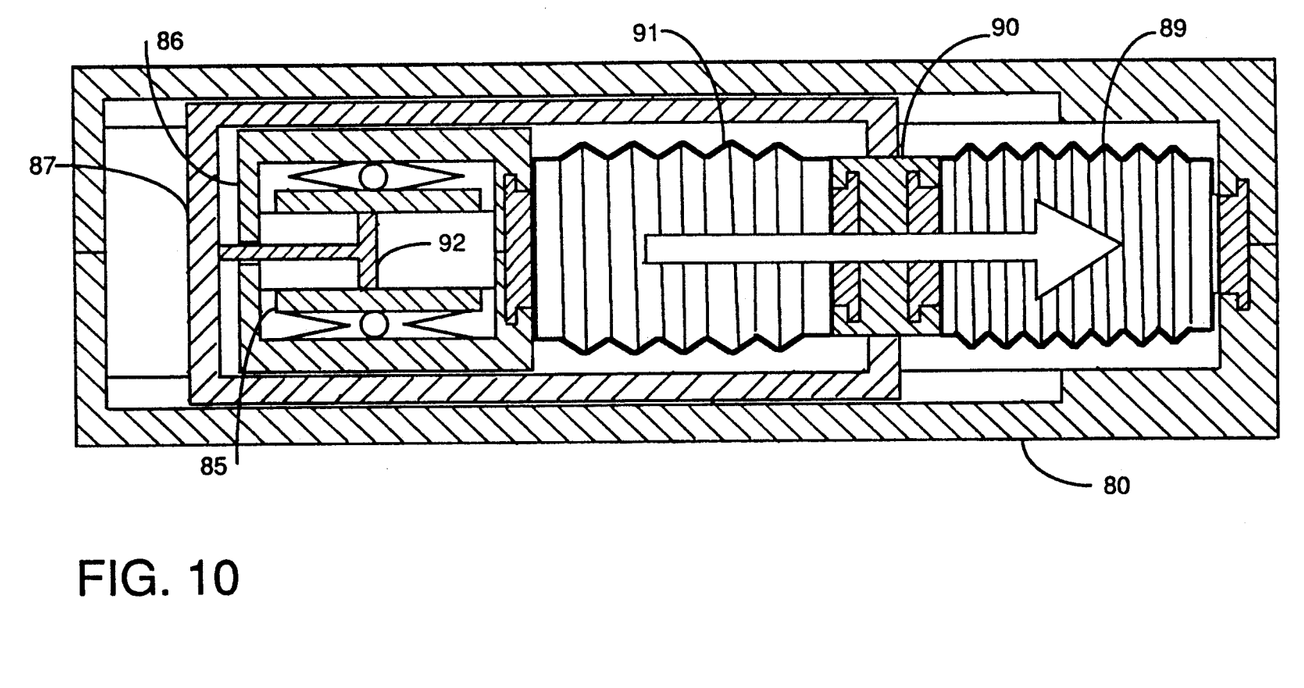
FIGS. 10 and 11 are schematic illustrations of the operation of the dual cushion pump shown in FIG. 9.
Figure 11:
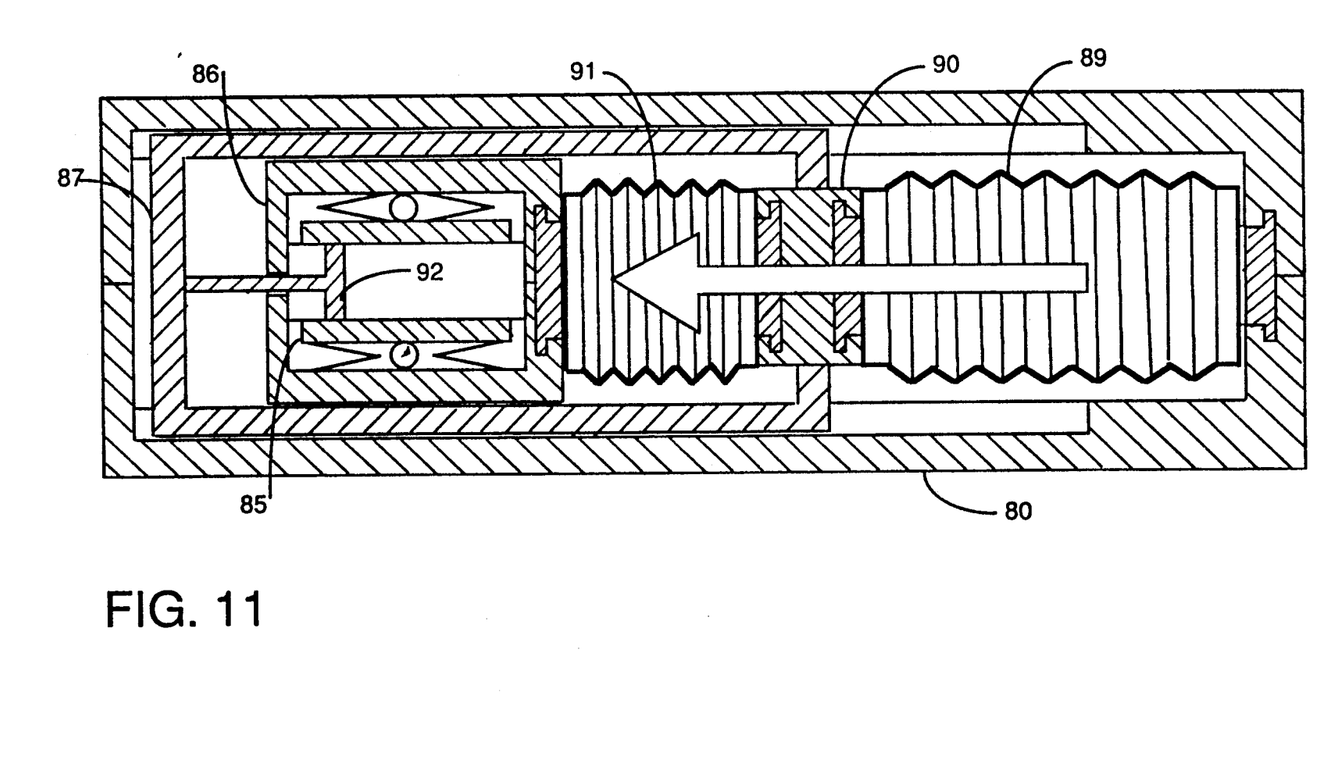

The operation of the embodiment of FIG. 9 will be better understood when the following description is read in view of FIG. 10. The two cushion chamber bellows 89 and 91 are used in the pump. One of the bellows are used to cushion the centrifugal force as the mass/connector/pump component slides toward the wheel rim and elongate the bellows 91. Because one end of the bellow 91 is attached to the closed housing 86 and the other to the piston 90, the elongation process causes a pressure drop inside the bellows below atmospheric pressure, resulting in a pressure differential that resists further elongation. The other bellows 89 are compressed between the pump housing 80 and the piston 90. As compression occurs the pressure increases inside of the bellows and the pressure differential resists further compression. FIGS. 10 and 11 show the sliding mechanism in two positions that have resulted from the addition of the centrifugal and gravitational forces at the bottom of wheel rotation, and the opposition the those two force at the top of wheel rotation, respectively.

Since the centrifugal force will always be greater than the gravitational force at vehicle speeds above a speed of 7 to 10 miles per hour, the low pressure bellows 91 will always be in an elongated position and the high pressure bellows 89 will be compressed. The degree of offset of the sliding mechanism comprising piston 90 from its static, non-operating position is a function of vehicle velocity and rate of wheel rotation. The variable gravitational force on the mechanism at a constant vehicle speed will be relatively small compared to the length of offset. The illustration of FIG. 10 and 11 dramatize the degree of this variability. The piston 92 reciprocates inside a cylinder 85 that is designed to pump compressed air in both directions of its stroke. Air channels on either side of the cylinder containing the one-way reed valves that provide for the inflow of atmospheric air on the expansion stroke side of the piston and the outflow of compressed air on the compression stroke side of the piston. The reed valves are an essential type of valve required to rapidly open and close as they are activated by small volumes of air. In addition, the valve faces that press together to prevent the reverse flow of air are flexible with maximum sealing area to prevent air-born particles from wedging them open. As described hereinbefore, the pistons 90 and 92 form an intensifier.

The pump compressed air output valve is connected directly to the tire valve. The tire valve mechanism is retained in the valve stem to insure that improper pump installation or operation does not cause tire deflation. An extension from the tire valve to the top of the pump housing allows for inflation of the tire using standard tire inflation connectors without removing the cyclic pump.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

I claim:

1. Apparatus for utilizing a cyclic resultant force of a centrifugal force and a gravitation force, said apparatus including:
    a vehicle wheel including a pneumatic tire;
    pump means including a piston reciprocal in a cylinder in response to the cyclically changing resultant force of centrifugal and gravitational forces acting on said piston for pressurizing air to inflate said pneumatic tire, said piston being acted upon by an air cushion for providing a restoring force; and
    attachment means at a site eccentric to the axis of rotation of said vehicle wheel for support of said pump means by said vehicle wheel externally of the pneumatic tire.

2. The apparatus according to claim 1 further including means for controlling the supply of pressurized air to the pneumatic tire by said pump means and to prevent pressurizing the pneumatic tire beyond a predetermined tire pressure.

3. The apparatus according to claim 2 wherein said means for controlling includes a control valve.

4. The apparatus according to claim 1 wherein said pump means further includes an intensifier piston reciprocal with said piston in response to cyclic differences to the resultant force.

5. The apparatus of claim 4 wherein said pump means further includes a pivotal lever and fulcrum support, said lever connected at one end to the pump piston and at the other end to the intensifier piston, said lever and said fulcrum support including cooperating structure for enabling reciprocal oscillation of said piston driven pump in response to pivotal oscillation of said lever.

6. The apparatus of claim 5 wherein said pump means further includes a second cylinder having first and second ends and said reciprocally oscillatable intensifier piston is slidably received in said second cylinder.

7. The apparatus of claim 6 wherein said fulcrum support includes a surface for cylindrically changing the effective length of the lever with respect to pivoting thereof.

8. The apparatus according to claim 1 wherein said air cushion includes a piston member reciprocable in a housing while joined with a connector, one end of the connector being coupled to said pump piston and the other end of the connector being coupled to said piston member.

9. The apparatus according to claim 8 wherein said piston member is reciprocable in the housing against bellows.

10. The apparatus according to claim 4 wherein said intensifier piston is reciprocable in a sleeve supported in a pump housing, and wherein said intensifier piston can slide to and from within said pump housing.

11. The apparatus according to claim 9 wherein said bellows comprises a high pressure and a low pressure bellows coupled end-to-end.

12. The apparatus according to claim 2 wherein said means for controlling includes a reed valve.

13. The apparatus according to claim 4 wherein said intensifier piston includes a large diameter piston having a mass which is large in relation to the diameter and mass of the piston of said pump means.

14. The apparatus according to claim 1 wherein said air cushion includes a high pressure bellows and a low pressure bellows acted upon by a piston while coupled to the piston of said pump means.

15. The apparatus according to claim 2 wherein said means for controlling includes inlet and outlet valves.

16. The apparatus according to claim 2 wherein said means for controlling includes an air pilot pressure operated valve.

17. The apparatus according to claim 1 wherein said piston reciprocates along a path of travel extending radially from the axis of rotation by said vehicle wheel.

18. Apparatus for pressurizing a pneumatic tire, said apparatus including:
    a vehicle wheel including a pneumatic tire;
    attachment means at a site eccentric to the axis of rotation of said vehicle wheel for enabling the utilization of a cyclic occurring resultant force of centrifugal and gravitation forces; and
    pump means including a piston reciprocal in a cylinder while supported by said attachment means for pressurizing air to inflate said pneumatic tire in response to the cyclically changing force acting on said piston, said piston being acted upon by an air cushion to provide a restoring force.

19. The apparatus according to claim 18 further including means for controlling the supply of pressurized air to the pneumatic tire by said pump means and to prevent pressurizing the pneumatic tire beyond a predetermined tire pressure.

20. The apparatus according to claim 19 wherein said means for controlling includes a control valve.

21. The apparatus according to claim 18 wherein said pump means further includes an intensifier piston reciprocal with said piston in response to cyclic differences to the resultant force.

22. The apparatus according to claim 21 wherein said pump means further includes a pivotal lever and a fulcrum support, said lever connected at one end of the pump piston and at the other end to the intensifier piston, said lever and said fulcrum support including cooperating structure for enabling reciprocal oscillation of said piston in response to pivotal oscillation of said lever.

23. The apparatus according to claim 22 wherein said pump means further includes a second cylinder having first and second ends and said reciprocally oscillatable intensifier piston is slidably received in said second cylinder.

24. The apparatus according to claim 23 wherein said fulcrum support includes a surface for cylindrically changing the effective length of the lever with respect to pivoting thereof.

25. The apparatus according to claim 18 wherein said air cushion includes a piston member reciprocable in a housing while joined with a connector on end of the connector being coupled to said pump piston and the other end of the connector being coupled to said piston member.

26. The apparatus according to claim 25 wherein said piston member is reciprocable in the housing against bellows.

27. The apparatus according to claim 21 wherein said intensifier piston is reciprocable in a sleeve supported in a pump housing and wherein said intensifier piston can slide to and fro within pump housing.

28. The apparatus according to claim 26 wherein said bellows comprises a high pressure and low pressure bellows coupled end-to-end.

29. The apparatus according to claim 19 wherein said means for controlling include a reed valve.

30. The apparatus according to claim 21 wherein said intensifier piston includes a large diameter piston having a mass which is large in relation to the diameter and mass of the piston of said pump means.

31. The apparatus according to claim 18 wherein said air cushion includes a high pressure bellows and a low pressure bellows acted upon by a piston while coupled to the piston of said pump means.

32. The apparatus according to claim 19 wherein said means for controlling includes inlet and outlet valves.

33. The apparatus according to claim 19 wherein said means for controlling includes an air pilot pressure operated valve.

34. The apparatus according to claim 18 wherein said piston reciprocates along a path of travel extending radially from the axis of rotation by said vehicle wheel.

* * * * *